United States Patent

Spenser

Patent Number: 5,868,532
Date of Patent: Feb. 9, 1999

[54] ARBOR FOR ENGAGING A SAW

[75] Inventor: Frank Spenser, Alcoa, Tenn.

[73] Assignee: American Saw & Mfg. Company, East Longmeadow, Mass.

[21] Appl. No.: 868,117

[22] Filed: Jun. 3, 1997

Related U.S. Application Data

[63] Continuation-in-part of Ser. No. 822,809, Mar. 24, 1997.

[51] Int. Cl.$^6$ ............................................. B23B 51/04
[52] U.S. Cl. ........................... 408/204; 408/233; 408/703
[58] Field of Search ................................... 408/204–209, 408/233, 703; 144/23

[56] References Cited

U.S. PATENT DOCUMENTS

| | | | |
|---|---|---|---|
| 3,758,221 | 9/1973 | Meshulam | 144/23 |
| 3,973,862 | 8/1976 | Segal | 408/204 |
| 4,148,593 | 4/1979 | Clark | 408/206 |
| 5,076,741 | 12/1991 | Littlehorn . | |
| 5,108,235 | 4/1992 | Czyzewski | 408/209 |
| 5,226,762 | 7/1993 | Ecker | 408/209 |
| 5,246,317 | 9/1993 | Koetsch et al. | 408/209 |
| 5,352,071 | 10/1994 | Cochran et al. | 408/703 |
| 5,658,102 | 8/1997 | Gale | 408/1 R |

FOREIGN PATENT DOCUMENTS

| | | |
|---|---|---|
| 1 404 350 | 8/1975 | United Kingdom . |
| 2257381 | 1/1993 | United Kingdom ................... 408/703 |
| 2 295 110 | 5/1996 | United Kingdom . |

*Primary Examiner*—Steven C. Bishop
*Attorney, Agent, or Firm*—Cummings & Lockwood

[57] ABSTRACT

An arbor for a hole saw includes a shaft and a plurality of pins having either bearing surfaces, drive portions or both for engaging the hole saw. The arbor further includes a fixed position flange and a locking plate located above the flange, to which the pins are connected. The saw is mounted to the arbor and has a cylindrical body portion having a closed end defined by a drive plate and an opposite end defining a cutting edge for performing sawing operations on a work piece. The drive plate includes apertures for receiving the drive portions of the pins which pass through holes in the flange. When assembled the drive ends of the pins extend through the holes in the flange and into the mating drive plate apertures such that the bearing surfaces on the pins engage and support the drive plate of the hole saw. The assembly is held together by a locking nut positioned above the locking plate and threaded onto the shaft such that it can be brought into engagement with the locking plate thereby urging and maintaining the bearing surfaces of the pins in engagement with the drive plate.

15 Claims, 2 Drawing Sheets

ARBOR FOR ENGAGING A SAW

CROSS-REFERENCE TO RELATED APPLICATION

This patent application is a continuation-in-part of U.S. patent application Ser. No. 08/822,809, entitled "AN ARBOR FOR ENGAGING A SAW", filed on Mar. 24, 1997 in the name of Frank Spenser.

FIELD OF THE INVENTION

The present invention relates generally to arbors for mounting cutting tools and deals more particularly with an arbor for mounting and supporting a hole saw.

BACKGROUND OF THE INVENTION

Hole saws are typically used to cut large diameter holes in materials such as wood and metal and are usually mounted by means of an arbor to a drill press or other power tool. During a cutting operation, these saws generate high levels of vibration and are prone to rocking back and forth on the arbor, an effect known to those skilled in the art as wobble. This effect causes premature wear in the saw and diminishes its cutting accuracy and efficiency.

To counter these effects, prior art arbors incorporate a fixed position flange and drive pin arrangement. The hole saw characteristically includes a cylindrical body portion defining a cutting edge at one end. The opposite end of the body portion is closed by a drive plate. A threaded bore at the center of the drive plate mates with a lower threaded shaft portion on the arbor. The saw is threaded onto the arbor until it abuts the aforementioned fixed position flange. The drive pins pass through holes in the flange and engage mating holes in the drive plate. The flange and the drive pins coact to support the hole saw during a sawing operation. However, it is often difficult or impossible to both align the drive pins with the holes in the drive plate and have the drive plate abut the fixed position flange. Generally, the saw must be backed off from the flange until the holes in both the saw and flange are aligned. This causes a gap to be created between the saw and the flange thereby preventing the drive plate from being supported by the fixed position flange. The presence of the gap allows the saw to wobble during a sawing operation. This problem is exacerbated as the saw and its mounting threads wear.

Based on the foregoing, it is the general object of the present invention to provide an arbor for supporting a saw that attenuates vibration and wobble while obviating the previously described alignment problems.

SUMMARY OF THE INVENTION

The present invention meets these and other objects by providing in one aspect, an arbor for engaging a hole saw, the hole saw including a cylindrical body having a closed end defined by a drive plate and an opposite end defining a cutting edge. The arbor comprises a shaft, a locking plate adjustably mounted on the shaft, and a plurality of pins mounted on the locking plate. At least one of the pins defines a bearing surface for engaging the drive plate of the hole saw and at least one of the pins defines a drive portion that is drivingly engageable with the drive plate.

In one embodiment, the plurality of pins includes at least one stepped pin. The stepped pin includes a shoulder defining a bearing surface, and a lower portion extending from the shoulder and defining a drive portion. The drive plate defines a plurality of mating apertures adapted to receive the drive portions of the stepped pins, such that the shoulders abut the drive plate when the hole saw and the arbor are assembled. These stepped pins can be used either alone, or in combination with the bearing pins described above.

In yet another embodiment, the plurality of pins includes at least one drive pin. The drive pin includes a drive portion for drivingly engaging the drive plate when the hole saw and the arbor are assembled. The drive pins are used in combination with the bearing and/or stepped pins.

In the preferred embodiment of the present invention, the arbor also includes a fixed position flange mounted on the shaft between the hole saw and the locking plate, and defining a plurality of holes through which the plurality of pins pass. In addition, the arbor includes an upper externally threaded shaft section located above the flange. A locking member, preferably comprised of a locking nut is threadedly engaged with the upper externally threaded shaft section and is located above the locking plate for releasably urging and maintaining the pin shoulders and/or the bearing surfaces of the bearing pins respectively against the drive plate when the arbor and the hole saw are assembled. An upwardly depending shank extends from the upper externally threaded shaft section for mounting the arbor to a suitable drive means such as a drill press, hand held drill, or other power tool.

DETAILED DESCRIPTION OF THE PREFERRED EMBODIMENT

Figure 1:
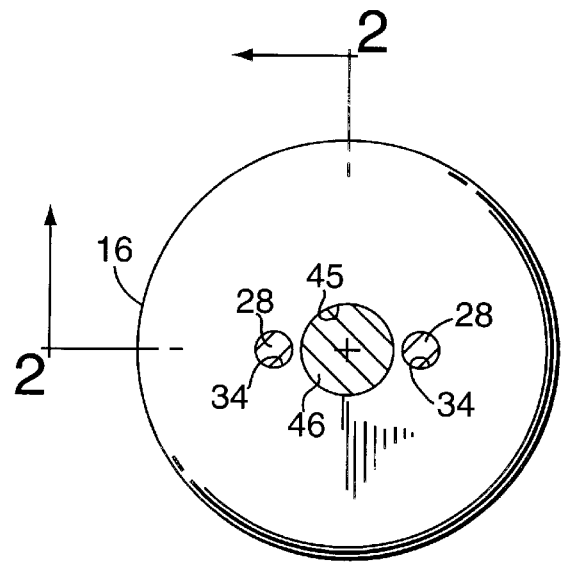
FIG. 1 is a top plan view of the drive plate of the hole saw of the present invention.
Figure 2:
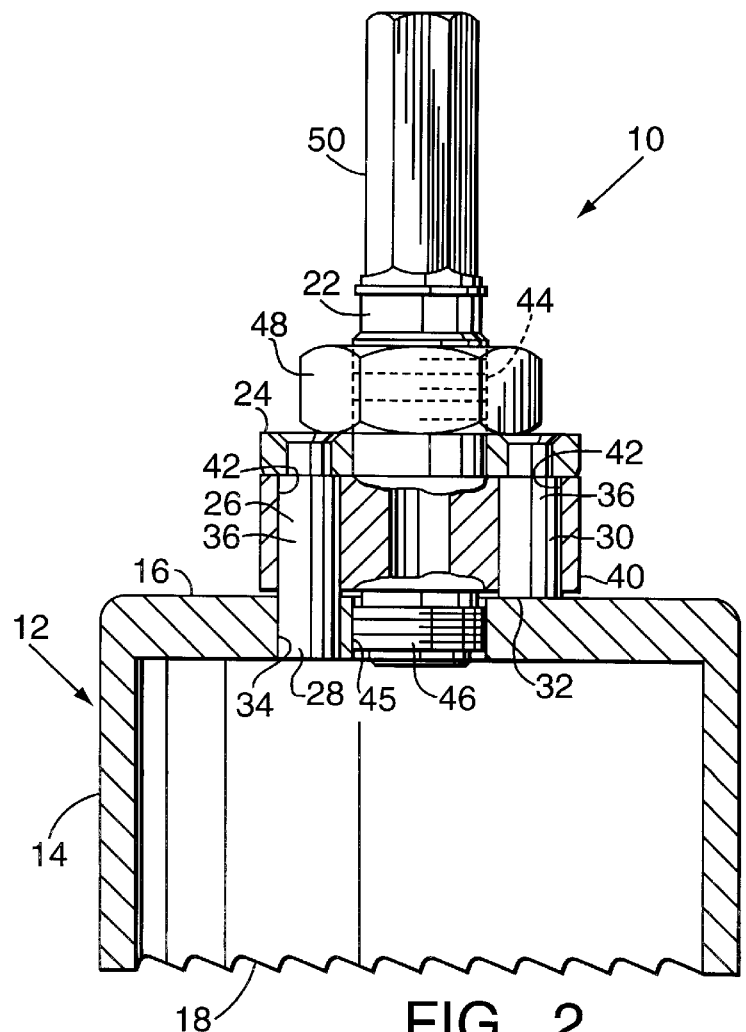
FIG. 2 is a sectional view of the arbor and hole saw assembly taken along the line 2—2 of FIG. 1.

FIGS. 1 and 2 illustrate an arbor, generally designated 10, embodying the present invention. The arbor 10 engages a hole saw 12 of the type having a cylindrical body portion 14 having a closed end defined by a drive plate 16 and an opposite end defining a cutting edge 18. The arbor includes a shaft 22, a locking plate 24 adjustably mounted on the shaft and having mounted thereto, two opposed drive pins 26, 26 (one shown) including drive portions 28, 28 for drivingly engaging the drive plate, and two opposed bearing pins 30, 30 (one shown) including bearing surfaces 32, 32 for engaging the drive plate.

Referring to FIG. 1, the drive plate 16 defines two mating apertures 34, 34 adapted to receive the drive portions 28, 28 of the drive pins 26, 26. While the locking plate is shown and described as having two drive pins and two bearing pins mounted to it, and the drive plate is shown and described as having two mating apertures, the invention is not limited in this regard as one, or a plurality of drive pins 26, bearing pins 30, and mating apertures 34 may be employed without departing from the broader aspects of the present invention.

The arbor 10 further includes a flange 40 mounted in a fixed position on the shaft 22 and defining holes 42 adapted to slidably receive upper shank portions 36 of the drive and bearing pins, 26, 26 and 30, 30 respectively, when the arbor 10 and hole saw 12 are assembled. An externally threaded upper shaft section 44 extends above the flange 40 and an externally threaded lower shaft section 46 extends below the flange 40. The drive plate 16 of the hole saw 12 preferably includes a central internally threaded bore 45 adapted to mate with the externally threaded lower shaft section 46. Therefore, when the arbor 10 and hole saw 12 are assembled, the drive plate 16 of the hole saw is threadedly engaged with the externally threaded lower shaft section 46. While the flange 40 is shown as a separate piece in the illustrated embodiment, it should be understood that the flange can also be formed integrally with the arbor.

A locking member 48, shown in FIG. 2, is engaged with the upper externally threaded upper shaft section 44, and is preferably comprised of a locking nut. The locking nut 48 is positioned above the locking plate 24, such that when the arbor 10 and the hole saw 12 are assembled, the locking nut 48 engages the locking plate 24 thereby releasably urging and maintaining the bearing surfaces 32, 32 against the drive plate 16. While the locking member 48 is shown and described as a locking nut, the present invention is not limited in this regard as any suitable locking member, such as a threaded collar or other means known to those skilled in the art, may be substituted without departing from the broader aspects of the present invention.

Still referring to FIG. 2, the arbor 10 also includes a shank 50 extending from the upper externally threaded portion 44 for mounting the arbor 10 to a suitable drive means such as, but not limited to a drill press, hand held drill, or other power tool.

When assembled, the hole saw 12 is mounted on the arbor 10 by mating the central threaded bore 45 in the drive plate 16 with the externally threaded lower shaft section 46 of the arbor 10. Next the locking plate 24 with the drive pins 26, 26 and the bearing pins 30, 30 mounted thereon is positioned on the arbor 10, such that the drive pins 26, 26, and the bearing pins 30, 30 pass through the holes 42 in the flange 40. The mating apertures 34, 34 in the drive plate 16 are then aligned with and receive the drive portions 28, 28 of the drive pins 26, 26. The locking nut 48 can now be threaded down the externally threaded upper shaft section 44 of the arbor until it engages the locking plate 24 thereby releasably urging and maintaining the bearing surfaces 32, 32 against the drive plate 16. With the components of the hole saw/arbor assembly locked in place by the locking nut 48, the need for the drive plate 16 to abut the flange 40 for support during a sawing operation is obviated as the bearing surfaces 32, 32 of the bearing pins 30, 30 cooperate with the drive plate 16 to adequately support the hole saw 12.

Figure 3:
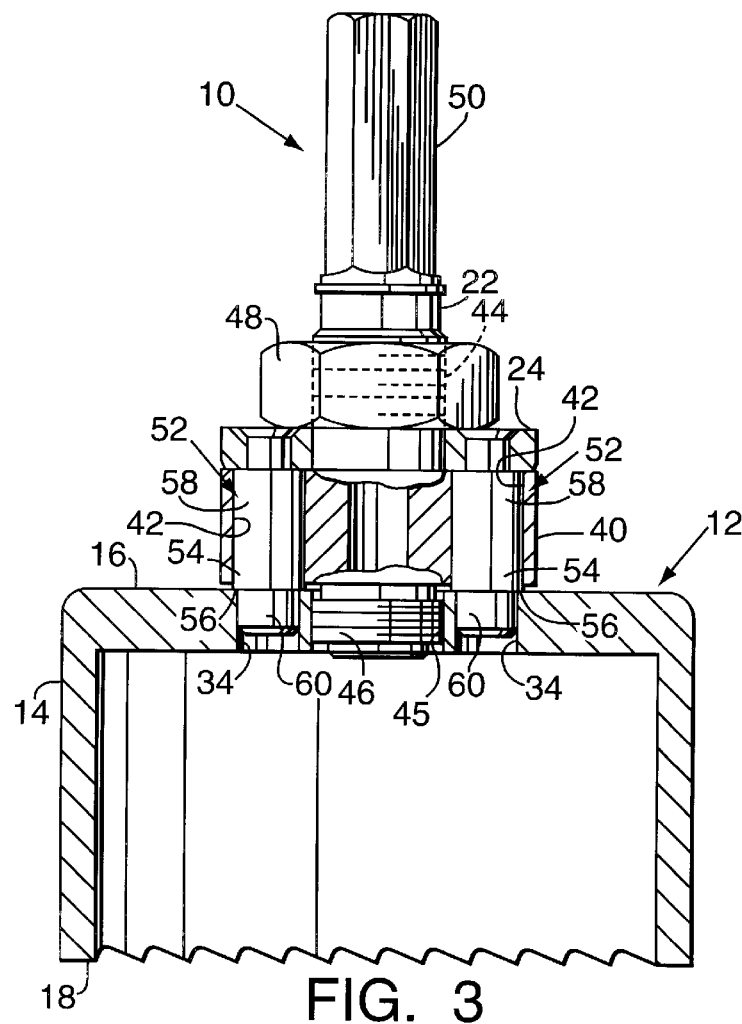
FIG. 3 is a sectional view of an alternate embodiment of the arbor and hole saw assembly of the present invention.
Figure 4:
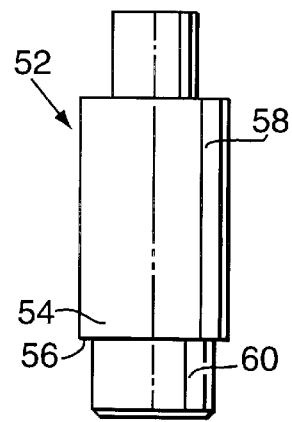
FIG. 4 is a front elevational view of a stepped pin of the present invention.

In an alternate embodiment of the arbor, best seen in FIGS. 3 and 4, stepped pins 52, 52 are employed, each including a drive end 54 having a shoulder 56, defining a bearing surface 57, for engaging the drive plate 16. The pins also include an upper shank portion 58, and a drive portion 60 extending from the shoulder 56, and adapted to be received in and drivingly engage the mating apertures 34, 34 of the drive plate 16. While the locking plate is shown and described as having two stepped pins 52 mounted thereto, and the drive plate 16 is shown and described as having two mating apertures 34, 34, the invention is not limited in this regard as one, or a plurality of combination pins and mating apertures may be employed without departing from the broader aspects of the present invention.

In addition to the foregoing, the present invention is not limited to any particular arrangement of drive, bearing, or stepped pins, as these may be used in several different configurations, either alone or together, in addition to those embodiments described and illustrated herein. For example, a combination of stepped pins 52 and bearing pins 30 could be employed such that the bearing pins define a first bearing surface 32 and the aforementioned shoulders on the stepped pins define a second bearing surface 57. Additionally, a combination of stepped and drive pins could be used with the drive pin having a first drive portion 28, and the stepped pins having a second drive portion 60, both adapted to be received in, and drivingly engage the mating apertures 34 in the drive plate 16.

While preferred embodiments of the present invention have been shown and described, various modifications and substitutions may be made without departing from the spirit and scope of the invention. Accordingly, it is to be understood that the present invention has been described by way of example, and not by limitation.

What is claimed is:

1. An arbor for engaging a hole saw including a cylindrical body portion having a closed end defined by a drive plate, said drive plate defining a back surface, and an opposite end defining a cutting edge, said arbor comprising:

a shaft;

a locking plate adjustably mounted on the shaft; and a plurality of pins mounted on the locking plate, at least one of said pins defining a drive portion drivingly engageable with said drive plate, and at least one of said pins defining a bearing surface engageable with the back surface of said drive plate.

2. An arbor for engaging a hole saw as defined by claim 1, wherein at least one of the plurality of pins is a drive pin including a drive portion for drivingly engaging the drive plate.

3. An arbor for engaging a hole saw as defined by claim 2, further comprises:

a bearing pin including a bearing surface for engaging the back surface of the drive plate.

4. An arbor for engaging a hole saw as defined by claim 1, wherein the plurality of pins comprises:

at least one stepped pin including a shoulder defining the bearing surface for engaging the back surface of the drive plate, and a drive portion extending from the shoulder for drivingly engaging the drive plate.

5. An arbor for engaging a hole saw as defined by claim 1, further comprising:

a flange mounted in a fixed position on the shaft and defining a plurality of through holes adapted to receive the plurality of pins.

6. An arbor for engaging a hole saw as defined by claim 5, further comprising:

an externally threaded lower shaft section extending below the flange, the drive plate of the saw being threadedly engaged with the externally threaded lower shaft section when the arbor and the saw are assembled.

7. An arbor for engaging a hole saw as defined by claim 1, further comprising:

a flange mounted in a fixed position on the shaft and defining a plurality of through holes adapted to receive the plurality of pins; and a locking member releasably engageable with the locking plate and the shaft for urging and maintaining the bearing surface against the back surface of the drive plate of the saw.

8. An arbor for engaging a hole saw as defined by claim 5, wherein the flange is formed integrally with the shaft.

9. An arbor for engaging a hole saw as defined by claim 7, wherein the shaft further includes an externally threaded upper shaft section located above the flange, and wherein the locking member comprises a locking nut threadedly engaged with the externally threaded upper shaft section for urging and maintaining the bearing surfaces against the back surface of the drive plate of the saw.

10. An arbor for engaging a hole saw as defined by claim 7, further comprising:

an externally threaded upper shaft section extending from the flange; and wherein the locking member comprises a collar threadedly engaged with the externally threaded upper shaft section.

11. An arbor for engaging a hole saw as defined by claim 1, wherein:

the drive plate defines at least one mating aperture for receiving the drive portion.

12. An arbor for engaging a hole saw including a cylindrical body portion having a closed end defined by a drive plate, said drive plate defining a plurality of mating apertures, and an opposite end defining a cutting edge, said arbor comprising:

a shaft;

a fixed position integral flange mounted on the shaft;

a locking plate located above the flange and adjustably mounted on the shaft;

at least one drive pin mounted on the locking plate and having a drive portion for engaging the mating apertures of the drive plate;

at least one bearing pin mounted on the locking plate, having a bearing surface for engaging a back surface of the drive plate; and the flange defining a plurality of through holes adapted to slidably receive the drive and bearing pins.

13. The arbor for engaging a hole saw as defined by claim 12, further comprising:

at least one stepped pin mounted to the locking plate and including a shoulder for engaging the drive plate and a drive portion extending from the shoulder for engaging the mating apertures of the drive plate.

14. An arbor for engaging a hole saw including a cylindrical body portion having a closed end defined by a drive plate, said drive plate defining a plurality of mating apertures, and an opposite end defining a cutting edge, said arbor comprising:

a shaft;

a fixed position integral flange mounted on the shaft;

a locking plate located above the flange and adjustably mounted on the shaft;

at least one stepped pin mounted to the locking plate including a shoulder for engaging a back surface of the drive plate and a drive portion extending from the shoulder for engaging the mating apertures of the drive plate;

the flange defining a plurality of through holes for slidably receiving the stepped pins.

15. The arbor for engaging a hole saw, as defined by claim 14, further comprising:

least one extending drive pin mounted on the locking plate and having a drive portion adapted to be slidably received in the mating apertures of the drive plate.

* * * * *